United States Patent [19]

Peyrovian

[11] Patent Number: 5,768,682
[45] Date of Patent: Jun. 16, 1998

[54] SHARED HYBRID-FIBER COAX TRANSMISSION SYSTEM HAVING IMPROVED BANDWIDTH IN THE STREAM CHANNEL WITH INGRESS NOISE REDUCTION

[75] Inventor: M. Javad Peyrovian, Aberdeen, N.J.

[73] Assignee: AT&T Corp, Middletown, N.J.

[21] Appl. No.: 687,818

[22] Filed: Jul. 26, 1996

[51] Int. Cl.⁶ .................................................. H04N 7/173
[52] U.S. Cl. ............................................. 455/5.1; 348/12
[58] Field of Search ........................ 348/6, 7, 8, 9, 348/10, 11, 12, 13, 14, 15, 16, 17, 18; 455/3.1, 4.1, 4.2, 5.1, 6.1, 6.2, 6.3; H04N 7/16, 7/173

[56] References Cited

U.S. PATENT DOCUMENTS

| | | | |
|---|---|---|---|
| 3,835,393 | 9/1974 | Marron | 348/12 |
| 4,709,266 | 11/1987 | Hanas et al. | 380/20 |
| 5,130,664 | 7/1992 | Pavlic et al. | 348/6 |
| 5,408,259 | 4/1995 | Warwick | 348/12 |
| 5,499,047 | 3/1996 | Terry et al. | 348/12 |
| 5,528,582 | 6/1996 | Bodeep et al. | 348/13 |
| 5,557,319 | 9/1996 | Gurusami et al. | 348/11 |
| 5,561,404 | 10/1996 | Ross | 375/214 |

*Primary Examiner*—Christopher C. Grant
*Attorney, Agent, or Firm*—Robert B. Levy

[57] ABSTRACT

Bandwidth is increased and noise may be reduced in a shared hybrid fiber-coax transmission system (10) by digitally modulating upstream information onto a high frequency band (e.g., 750–1000 MHz) and thereafter digitally regenerating the high frequency upstream information.

4 Claims, 5 Drawing Sheets

SHARED HYBRID-FIBER COAX TRANSMISSION SYSTEM HAVING IMPROVED BANDWIDTH IN THE STREAM CHANNEL WITH INGRESS NOISE REDUCTION

TECHNICAL FIELD

This invention relates to a technique for providing reliable digital transmission, reduced ingress noise and increased upstream bandwidth in a shared hybrid-fiber coax transmission system, as well as in an all-coax transmission system.

BACKGROUND ART

Most existing Cable Television (CATV) systems provide one-way transmission of information (e.g., video signals) from a CATV Head-End to individual subscribers via a network of coaxial cables or a combination of optical fibers and coaxial cables. When these systems are upgraded for two-way transmission, a low frequency band, typically 5–40 MHz, is assigned to upstream signals generated by individual subscribers. In contrast, downstream signals generated by the head end and destined for individual subscribers are assigned a higher frequency band (e.g., 50–750 MHz). Noise measurements in present day cable systems have shown that noise and interference ("noise") are very high in the 5–40 MHz band. There are numerous sources of noise in this frequency band. For example, amateur, citizens band, and mobile radio systems all operate in the 5–40 MHz band and constitute a source of noise. Home appliances also generate noise in the 5–40 MHz band.

Present day share cable systems aggregate (sum) the upstream signals from individual subscribers for transmission to the head. Such systems also aggregate noise from households passed (HHPS). To assure reliable transmission, the aggregated amount of upstream ("ingress") noise must be reduced. One possible solution is to run fiber closer to the subscriber to reduce the number of total number HHPS per fiber node, thereby reducing the level of aggregated noise. This solution is very costly due to deployment of new fiber nodes and fiber installations. Another solution is to deploy digital repeaters within the coaxial cable distribution network as taught in co-pending U.S. patent application Ser. No. 08/650,683, "Shared Hybrid-fiber-Coax Network Having Reduced Ingress Noise," filed May 20, 1996, and assigned to AT&T Corp. (herein incorporated by reference). While this solution resolves the noise and interference problem, it does not provide enough bandwidth for high market penetration of broadband services. Another proposed solution is to employ so-called Mini-Fiber-Nodes (mFNs) wherein additional fibers run from the head-end to trunk and line extender amplifier locations in the coaxial cable plant. The mFNs are co-located with the trunk and line extender amplifier locations and employ a relatively inexpensive laser to transmit signals back to the head end. This solution also overcomes the problem of ingress noise by operating in a higher frequency band (750–1000 MHz) as well as the small number of HHPS per mini-fiber node. Further, this solution provides a sufficient amount of bandwidth for the upstream information. However, the cost of running such fibers is significant.

BRIEF SUMMARY OF THE INVENTION

Briefly, in accordance with a preferred embodiment of the invention, a method is provided for reducing ingress noise and increasing frequency bandwidth in a shared hybrid fiber-coax system. Pursuant to the invention, information originating at the subscriber premises is digitally modulated via a carrier to a high frequency band (typically 750–1000 MHz) that is allocated to for upstream information transmission. The modulated signal is then digitally regenerated by at least one repeater. Each repeater, by its nature, will generate an essentially noise-free output signal for transmission upstream to the head-end if the signal-to-noise ratio of the upstream information is adequate that is usually the case. From a noise perspective, deploying repeaters in this manner accomplishes the same effect as reducing the number of HHPS served by each fiber node, without actually reducing the number of HHP that are served. Moreover, since the repeaters operate in a high frequency band, there is sufficient bandwidth for emerging broadband services and high market penetration. This approach of digitally regenerating the upstream information and modulating the information via a carrier to a high frequency band is applicable to all-coax cable systems as well as hybrid fiber-coax systems.

DETAILED DESCRIPTION

Figure 1:
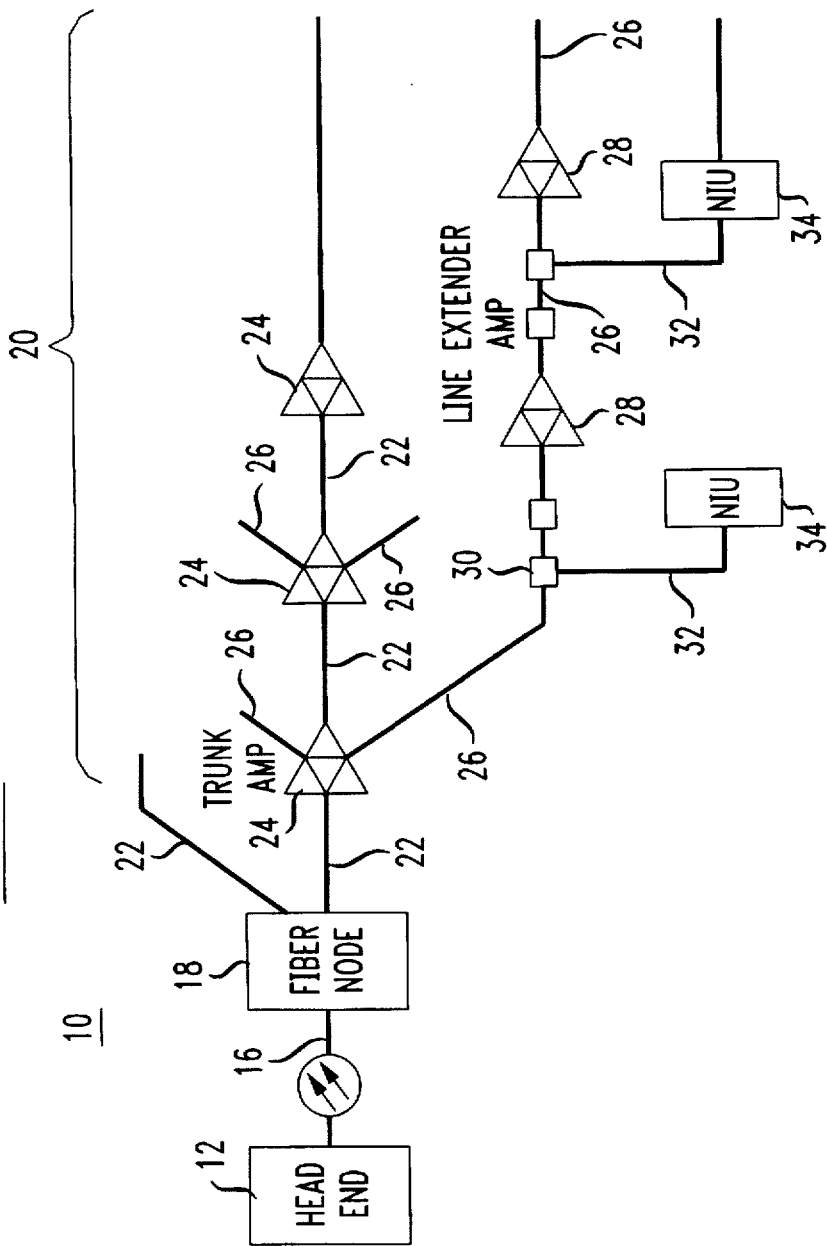
FIG. 1 is a block diagram of a present day shared hybrid fiber-coax transmission system in accordance with the prior art.

FIG. 1 depicts a hybrid-fiber-coax transmission system 10 in accordance with the prior art. The system 10 includes a head end 12 for generating information, e.g., video, audio, multimedia, data and/or text ("downstream information") for transmission to individual subscribers 14—14. The head end 12 also receives information, ("upstream information"), e.g., video, audio, multimedia, data and/or text, generated by one or more of the subscribers 14—14.

In practice, a combination of optical fibers and coaxial cables carry the downstream information from the head end 12 to the subscribers 14—14 and carry the upstream information from the subscribers to the head end. As seen in FIG. 1, an optical fiber link 16, comprised of an upstream and down stream fibers (not shown), carries both the upstream and downstream information in an optical format between the head end 12 and a fiber node 18. The fiber node 18 converts the optically-formatted downstream information received from the head end 12 into electrical signals for distribution via a coaxial cable distribution network 20 to the individual subscribers 14—14. Further, the fiber node 18 converts subscriber-generated upstream information, received via the coaxial cable distribution network 20, into an optically-formatted signal for transmission to the head end 12.

The cable distribution network 20 has a tree and branch architecture and includes at least one, and typically four coaxial trunk cables 22—22. Each of the trunk cables 22—22 typically has at a plurality of branching trunk amplifiers 24—24 cascaded along its length for amplifying the upstream and downstream information. (In practice, each branching trunk amplifiers is comprised of individual amplifying elements and diplexers (not shown) that separately amplify the upstream and downstream information.) Each trunk amplifier 24 feeds one or more distribution cables 26—26. Each distribution cable 26 typically has one or more line extenders 28—28 cascaded along its length for amplifying the upstream and downstream information carried by each distribution cable. The distribution cables 26—26 each contain a plurality of taps 30—30 via which a connection may be made to each branch. Each tap 30 is connected via a coaxial drop cable 32 to a network interface unit (NIU) 34 through which an individual subscriber 14 receives downstream information and through which the subscriber transmits upstream information.

Presently, each NIU 34 formats all of the upstream information generated by a corresponding subscriber 14 via a carrier onto a low frequency band, typically 5–40 MHz. The low frequency band presently used to carry subscriber-generated upstream information is relatively narrow and is subject to significant noise from a variety of sources.

Figure 2:
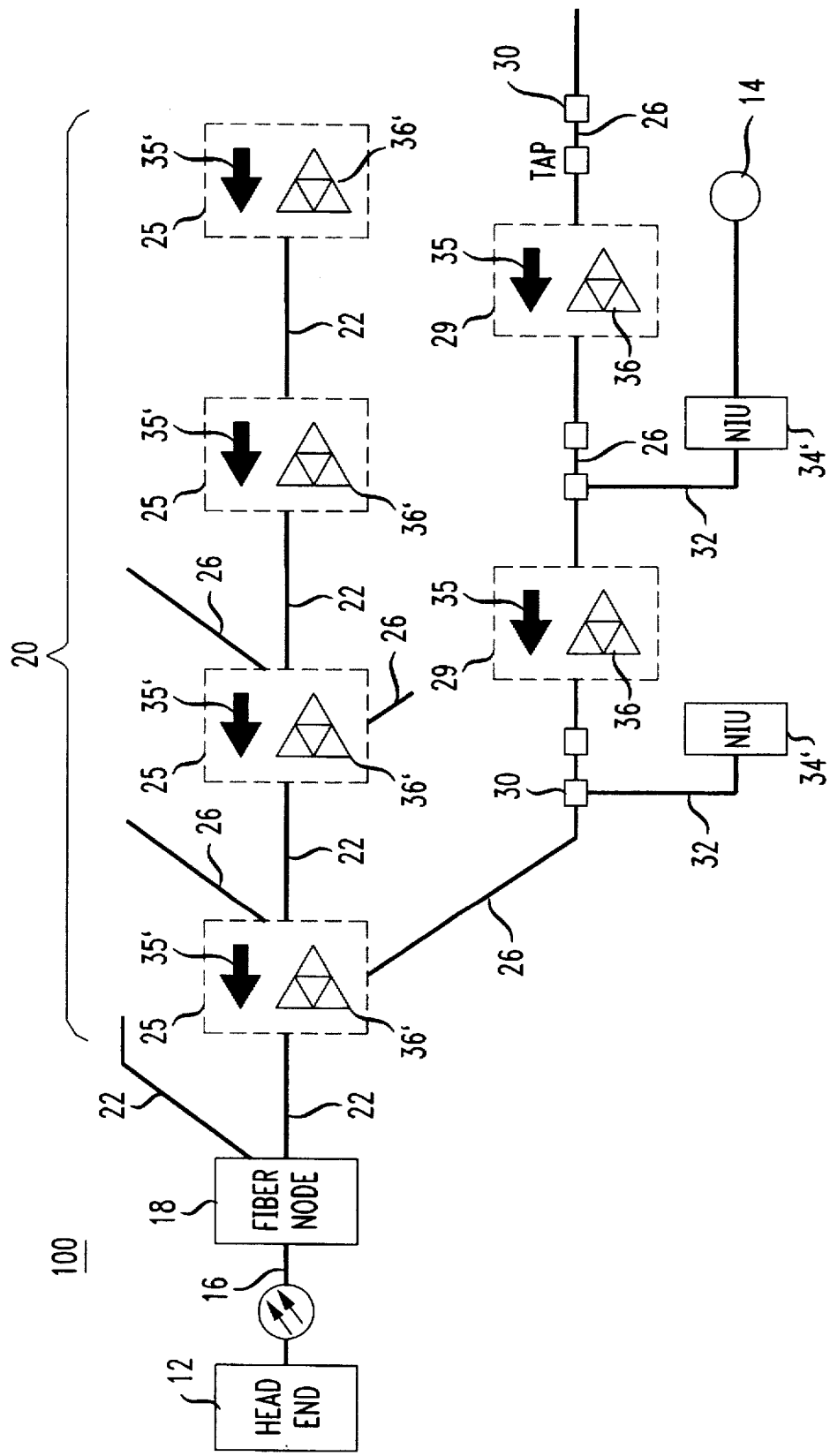
FIG. 2 is a block diagram of a shared hybrid fiber-coax transmission system in accordance with the invention.

FIG. 2 shows a shared hybrid fiber-coax system 100 in accordance with the invention having reduced ingress noise and increased upstream bandwidth. The system 100 of FIG. 2 is similar in many respects to the network of FIG. 1 and like numbers have been used for like elements. However, the network 100 of FIG. 2 does differ from the network of FIG. 1 in several respects. In particular, the network 100 of FIG. 2 includes an NIU 34' in place of the NIU 34 of FIG. 1. Referring to FIG. 2, the NIU 34' operates to interface a corresponding subscriber 14 to an associated tap 30 in much the same way as does the NIU 34 of FIG. 1. However, unlike the NIU 34 of FIG. 1 that operates to modulate all of the upstream information generated by the subscriber 14 onto the low frequency band of 5–40 MHz, the NIU 34' of FIG. 3 modulates at least a portion of the upstream subscriber-generated information via a carrier to a high frequency band (e.g., 750–1000 MHz), above the band on which the downstream information is carried.

There are several advantages to modulating at least a portion of the upstream information via a carrier to such a high frequency band. First, the high frequency band (750–1000 MHz) lying above the downstream information band (e.g., 50–750 MHz) is typically much less susceptible to noise than the low frequency band (5–40 MHz) that has traditionally been employed to carry the upstream information. Further, the frequency band of 750–1000 MHz has a much greater bandwidth than the low frequency band of 5–40 MHz.

Additionally, the network 100 of FIG. 2 differs from the network 10 of FIG. 1 by the presence of trunk amplifiers 25—25, each with a regenerator element 35' and an amplifying element 36', in place of the trunk amplifiers 24—24. Further, the network 100 of FIG. 1 also includes line extenders 29—29, each with a regenerator element 35 and an amplifying element 36, in place of the line extenders 28—28 of FIG. 1.

Figure 3:
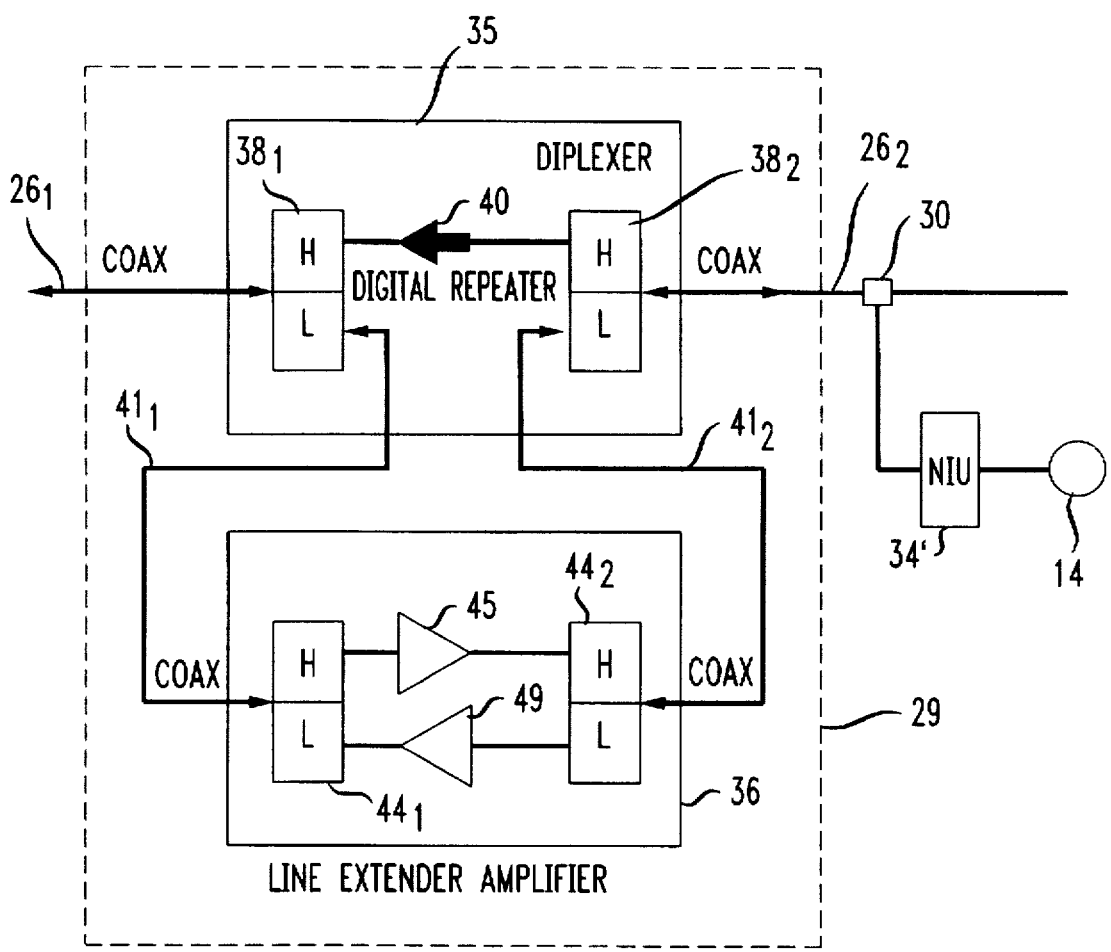
FIG. 3 is a block diagram of a first embodiment of a line extender incorporating a digital repeater in accordance with the present invention for use with the shared hybrid fiber-coax system of FIG. 2.

FIG. 3 depicts a line extender 29 that may be substituted for one of the line extenders 28—28 of FIG. 1. As seen in FIG. 3, the regenerator element 35 within the line extender 29 comprises upstream and downstream diplexers $38_1$ and $38_2$, respectively, connected to upstream and downstream distribution cable segments $26_1$ and $26_2$, respectively, representing upstream and downstream portions, respectively, of one of the distribution cables 26—26.

The downstream diplexer $38_2$ functions to separate the subscriber-originated upstream information (now modulated via a carrier to the high frequency band) from information that is below the high frequency band. The lower frequency signals typically include the downstream information modulated onto the 50–750 MHz band for receipt by individual subscribers 14—14 as well as subscriber-generated upstream information that is modulated onto the low frequency band (5–40 MHz). (There may be some services for which it is desirable to modulate subscriber-generated upstream information via a carrier to the low frequency band of 5–40 MHz despite potential noise. However, for other applications, such as telephony where the system 10 provides the subscribers 14—14 with local telephone or data access, it is desirable to modulate such subscriber-generated information onto the high frequency band.)

The high frequency upstream information that is separated by the diplexer $38_2$ passes to a digital repeater 40 configured the same as the digital repeater described in the aforementioned co-pending application Ser. No. 08/650,683 (incorporated by reference herein). The digital repeater 40 digitizes and regenerates the high frequency upstream information to yield a substantially noise-free signal so long as the signal-to-noise ratio of the incoming subscriber-generated high frequency upstream information is adequate which is typically the case. The regenerated upstream information produced by the digital repeater 40 passes to the upstream diplexer $38_1$ for injection onto the upstream branch distribution cable segment $26_1$ for ultimate transmission to the head end 12 of FIG. 2 via the fiber node 18 of FIG. 2.

As discussed, lower frequency signals (those below the upstream information modulated via a carrier onto the 750–1000 MHz band) include both the downstream information destined for the subscribers 14—14 as well as low frequency, subscriber-generated upstream information. The lower frequency information downstream information is separated by the upstream diplexer $38_1$ and passes via a coaxial cable $41_1$ to an amplifier assembly 36 for receipt by an upstream diplexer $44_1$ within the amplifier assembly. The upstream diplexer $44_1$ separates the downstream information modulated onto the frequency band of 50–750 MHz from low frequency subscriber-generated upstream information that is received in a manner described hereinafter.

The downstream information passes from the diplexer $44_1$ to an amplifier 45 for amplification. From the amplifier 45, the downstream information passes to a downstream diplexer $44_2$, which like the upstream diplexer $44_1$ separates the higher frequency downstream information from the low frequency upstream information received from subscribers. A coaxial cable $41_2$ links the diplexer $44_2$ in the amplifier assembly 36 to the downstream diplexer $38_2$. In this way, the amplified downstream information received at the diplexer $44_2$ passes to the diplexer $38_2$ for passage on the distribution cable segment $26_2$ for ultimate receipt by the subscribers 14—14.

Any low frequency subscriber-generated upstream information (i.e., subscriber information modulated in the 5–40 MHz band) received on the downstream distribution branch cable segment $26_2$ is separated by the downstream diplexer $38_2$ and passes to the diplexer $44_2$ for transmission to an amplifier 49 within the amplifier assembly 36. The low frequency upstream information is amplified by the amplifier 49 and passes to the diplexer $44_1$ for transmission to the upstream diplexer $38_1$ at which the information is injected onto the upstream branch distribution cable segment $26_1$.

The regenerator assembly 35 and amplifier assembly 36, in combination serve to "triplex", that is separate into three constituent elements, the high frequency subscriber-generated upstream information, the downstream information, and the low-frequency subscriber-generated upstream information. To assure a substantially noise-free signal, the high frequency upstream information is digitally regenerated via the repeater 40 within the regenerator assembly 35. In this way, the line extender 29 of the invention, comprised of the regenerator assembly 35 assembly and the amplifier assembly 36, provides both high bandwidth and significant noise reduction. (Note that the prior art line extender 28 of FIG. 1 can be utilized to create the amplifier assembly 36, allowing for reuse of the line extender.) Moreover, the amplifier 29 can be readily substituted for the line extenders 28—28 relatively easily without the need for additional fiber.

Figure 4:
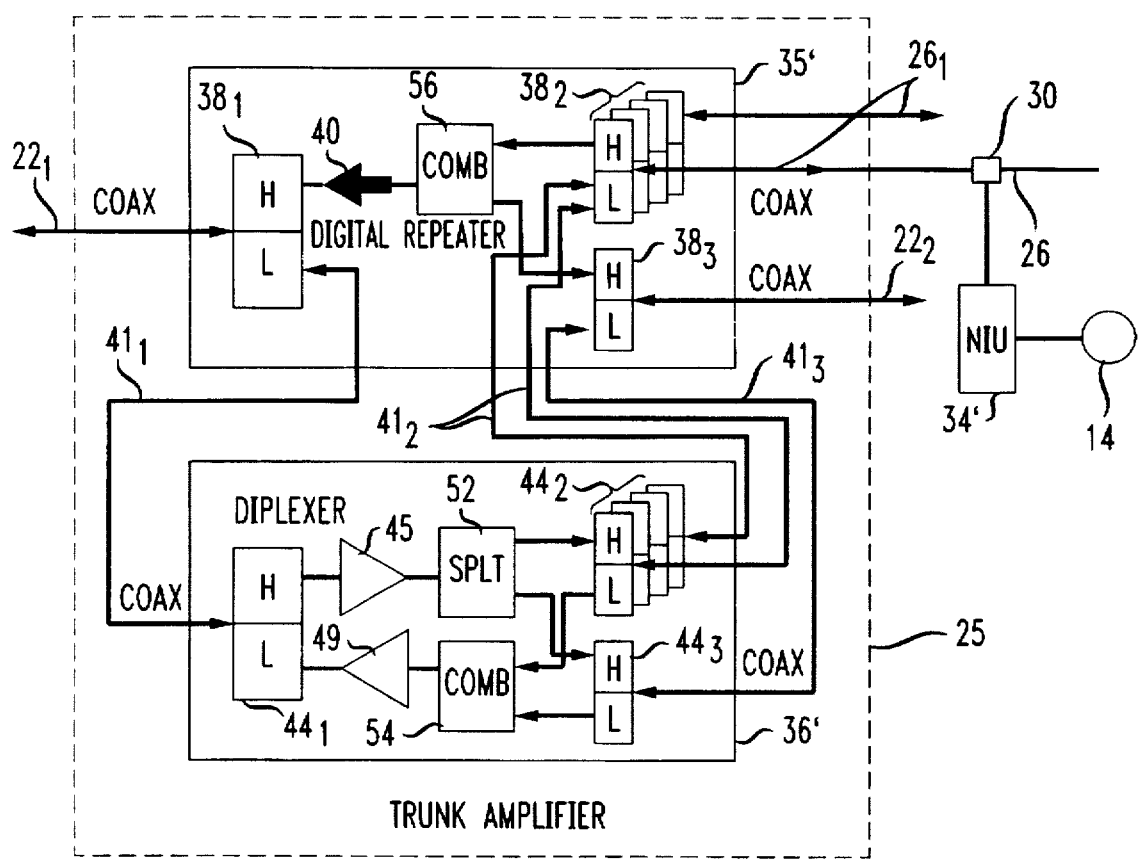
FIG. 4 is a block diagram of a trunk amplifier incorporating a digital repeater in accordance with the present invention for use with the shared hybrid fiber-coax system of FIG. 2.

Referring to FIG. 4, there is shown a block diagram of the trunk amplifier 25 of the invention for substitution in place of the trunk amplifier 24. The trunk amplifier 25 of FIG. 4 comprises a regenerator assembly 35' and an amplifier assembly 36' similar to the regenerator 35 assembly and amplifier assembly 36 of the line extender 29 of FIG. 3. Therefore, like numbers have been used to reference like elements. (Note that the line extender 28 can be re-used as the amplifier assembly 36.) However, the trunk amplifier 25 of FIG. 4 differs in several respects from the line extender 29 of FIG. 3 because the trunk amplifier 25 typically terminates more than a pair of upstream and downstream cables.

As seen in FIG. 4, the regenerator assembly 35' of the trunk amplifier 25 comprises a plurality of branch downstream branch diplexers $38_2$—$38_2$ and a downstream trunk diplexer $38_3$. Each of the branch diplexers $38_2$—$38_2$ separates the subscriber-originated upstream information that is modulated via a carrier to the high frequency band on a separate one of the branch distribution cables 26—26 terminating at the trunk amplifier 25 from information on each branch distribution cable that is below the high frequency band. The lower frequency signals typically include the downstream information modulated onto the 50–750 MHz as well as any subscriber-generated upstream information that is modulated onto the low frequency band (5–40 MHz). The trunk diplexer $38_3$ separates the high frequency subscriber-originated upstream information present on a trunk cable segment $22_1$ from lower frequency signals on that trunk segment. The high frequency subscriber-originated upstream information separated by the branch diplexers $38_2$—$38_2$ and by the trunk diplexer $38_3$ are combined by a combiner 56 before being regenerated by a repeater 40. An upstream diplexer $38_1$ receives the now-regenerated high frequency upstream information from the repeater 40 and injects the information onto an upstream trunk segment $22_1$.

The upstream diplexer $38_1$ also serves to separate lower frequency information on the upstream trunk segment $22_1$ from the high-frequency upstream information. A coax cable $41_1$ carries the lower frequency information separated by the diplexer $38_1$ to an upstream diplexer $44_1$ within the amplifier assembly 36'. The upstream diplexer $44_1$ separates the downstream information destined for each of the subscribers 14—14 and passes such information to an amplifier 45. The higher downstream information is amplified by the amplifier 45 prior to being split by a splitter 52 for distribution to each of a plurality downstream branch diplexers $44_2$—$44_2$ and a downstream trunk diplexer $44_3$.

Each of the branch diplexers $44_2$—$44_2$ is coupled via a separate one of cables $41_2$—$41_2$ to a separate one of the downstream branch diplexers $38_2$—$38_2$, respectively, within the regenerator assembly 35'. In this way, the downstream information passes from the diplexers $44_2$—$44_2$ for input to a corresponding one of the downstream diplexers $38_2$—$38_2$ and ultimate injection onto a separate one of the downstream branch distribution cables 26—26.

The coaxial cables $41_2$-$42_2$ also carry low frequency (5–40 MHz) upstream information, separated by each of the downstream diplexers $38_2$—$38_2$, to the downstream diplexers $44_2$—$44_2$, respectively, which separate such signals and pass them to a combiner 54 that combines the signals for passage to an amplifier 49 whose output is coupled to the upstream diplexer $44_1$. The upstream diplexer $44_1$ injects the low frequency signals upstream signals received from the amplifier 49 onto an upstream trunk cable segment $22_1$.

The downstream trunk diplexer $44_3$ receives a portion of the downstream signals split by the splitter 52 and passes such signals via a coaxial cable $41_3$ to the downstream trunk diplexer $38_3$ within the regenerator assembly 35'. The downstream trunk diplexer $38_3$ injects the downstream signals received via the cable $41_3$ onto a downstream trunk cable segment $22_2$. The downstream diplexer $38_3$ within the regenerator assembly 35' also serves to separate low frequency upstream signals present on the downstream trunk coax segment $22_2$ and passes such signals via the cable $41_3$ to the downstream trunk diplexer $44_3$ within the amplifier assembly 36'. The downstream trunk diplexer $44_3$ in the amplifier assembly 36' passes the low frequency upstream information to the combiner 54 where such information is combined with the low frequency upstream information separated by the downstream branch diplexers $44_2$—$44_2$.

Figure 5:
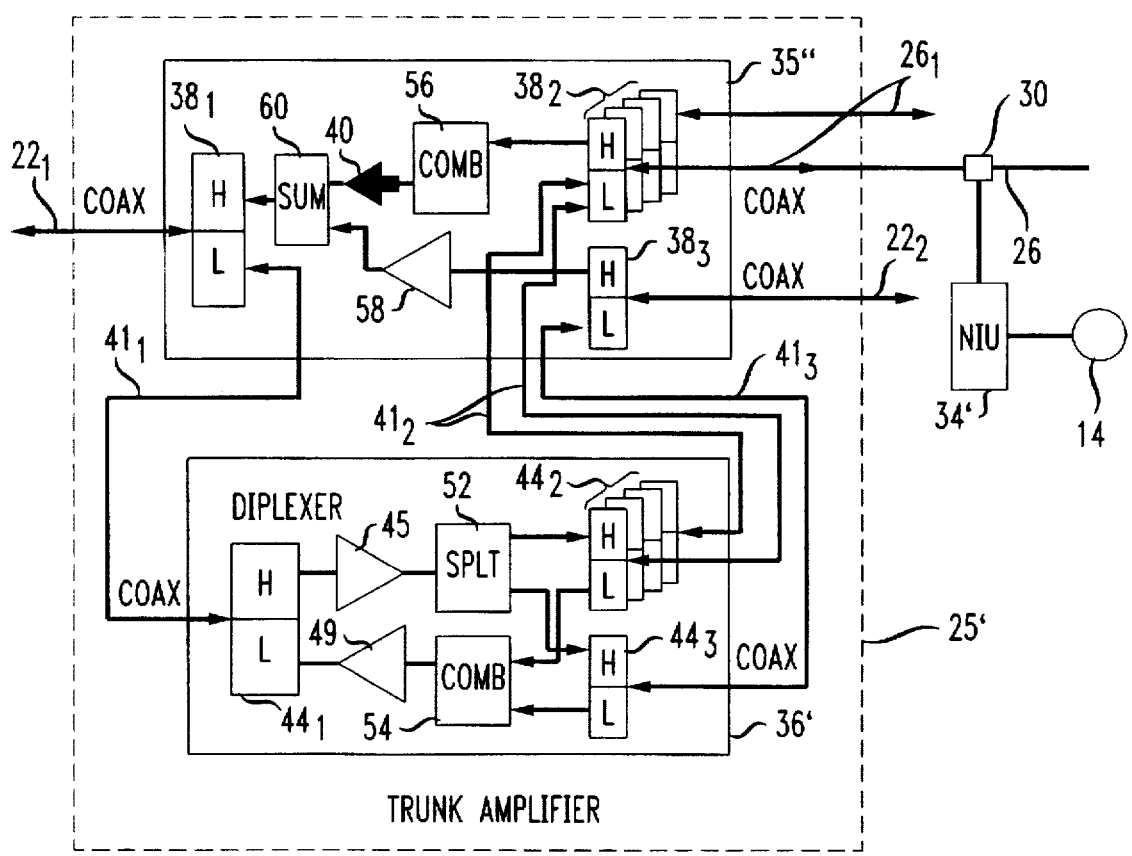
FIG. 5 is a block diagram of a second embodiment of a trunk amplifier incorporating a digital repeater in accordance with the present invention for use with the shared hybrid fiber-coax system of FIG. 2.

As may be appreciated, the trunk amplifier 25 of FIG. 4 operates to digitally regenerate upstream information modulated onto a high frequency band (750–1000 MHz) that is received from both the distribution cables 26—26 as well as the downstream trunk segment $22_2$. In some instances it may be desirable only to regenerate the high frequency upstream information received on the distribution cables 26—26 and not the high frequency upstream information received on the downstream trunk segment $22_2$. FIG. 5 shows a trunk amplifier 25' for regenerating only the high frequency upstream information received on the branch distribution cables 26—26.

The amplifier 25' of FIG. 5 is similar to the amplifier 25 of FIG. 4 and like numbers have been used to describe like elements. However, the amplifier 25' includes a regenerator assembly 35" that differs in the following respect from the regenerator assembly 35' of amplifier 25 of FIG. 4. The regenerator assembly 35' of FIG. 5 has its downstream branch diplexer $38_3$ coupled to amplifier coupled 58 rather than to the combiner 56 as in the case of the regenerator assembly 35' of the amplifier 25 of FIG. 4. The amplifier 58 within the regenerator assembly 35' of FIG. 5 has its output coupled to a summer 60 that is supplied with the output of the repeater 40. The summer 60 supplies the sum of the output signal of the repeater 40 with that of the amplifier 58 to the upstream diplexer $38_1$ for injection onto the upstream trunk coax segment $22_1$. In this way, only the upstream high frequency information received on the distribution branch cables 26—26 is regenerated by the repeater 40 of FIG. 5 in contrast to the amplifier 25 which regenerates the high frequency information received both on the downstream branch distribution cables 26—26 and on the downstream trunk segment $22_2$.

The foregoing discloses a technique for achieving reliable digital transmission, reduced ingress noise and increased bandwidth in a shared hybrid-fiber coax transmission system by modulating at least a portion of the subscriber generated information into a high frequency band and then digitally regenerating such information to reduce the presence of ingress noise.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. For use with a shared hybrid-fiber coax transmission system that transmits downstream information within a first frequency band on a main coax from a head end to individual subscribers and which transmits upstream information generated by individual subscribers to a head end on said main coax, a method for increasing the band width and reducing the noise associated with the upstream information, comprising the steps of:

digitally modulating at least a first portion of the upstream information into a second frequency band above the downstream information;

aggregating the digitally modulated upstream information in the second frequency band onto the main coax and digitally regenerating the upstream information aggregated on the main coax and modulated into the second frequency band.

2. The method according to claim 1 wherein the first portion of the upstream information is modulated via a carrier to a frequency band of 750–1000 MHz.

3. The method according to claim 1 wherein a second portion of the upstream information is modulated via a carrier to a third frequency band below the frequency of the downstream information.

4. The method according to claim 3 wherein the second portion of the upstream information is modulated onto a frequency band of 5–40 MHz.

* * * * *